United States Patent [19]
Mistrater et al.

[11] Patent Number: 5,320,364
[45] Date of Patent: Jun. 14, 1994

[54] MANDREL WITH EXPANDABLE HIGH TEMPERATURE ELASTOMERIC POLYMER DISK AND PROCESS FOR USING MANDREL

[75] Inventors: Alan B. Mistrater; Stanley J. Pietrzykowski; Alfred O. Klein, all of Rochester; Loren E. Hendrix, Webster; Mark C. Petropoulos, Ontario; Paul L. Jacobs; Eugene A. Swain, both of Webster; Alexander A. Antonelli, Rochester, all of N.Y.

[73] Assignee: Xerox Corporation, Stamford, Conn.

[21] Appl. No.: 996,430

[22] Filed: Dec. 23, 1992

[51] Int. Cl.$^5$ .............................................. B23B 31/40
[52] U.S. Cl. ................................ 279/2.17; 198/803.7; 269/48.1; 294/93
[58] Field of Search ................. 279/2.01, 2.1–2.12, 279/2.17, 2.22; 269/48.1; 242/68.2, 72 R; 294/93; 414/910; 198/803.7–803.9, 803.12; 118/500

[56] References Cited

U.S. PATENT DOCUMENTS

| 574,763 | 1/1897 | Rudolph | 279/2.17 X |
| 3,777,875 | 12/1973 | Sobran | 198/131 |
| 3,945,486 | 3/1976 | Cooper | 198/179 |
| 4,680,246 | 7/1987 | Aoki et al. | 430/133 |

FOREIGN PATENT DOCUMENTS

| 1156896 | 5/1958 | France | 279/2.17 |
| 0217778 | 1/1985 | German Democratic Rep. | 294/93 |

Primary Examiner—Steven C. Bishop

[57] ABSTRACT

A mandrel for transporting a hollow cylinder including an elongated arm having an imaginary axis, an expandable disk shaped member having at least one hole and a circular outermost edge, the disk shaped member being mounted on and coaxially aligned with one end of the arm and including an elastomeric polymer material having a durometer of between about 25 and about 35 and a maximum continuous use temperature rating of at least about 230° C., and means mounted on the mandrel to apply compressive pressure to the disk shaped member to increase the length of the circumference of the circular outermost edge. This mandrel is used in a process for coating hollow cylinders.

14 Claims, 4 Drawing Sheets

MANDREL WITH EXPANDABLE HIGH TEMPERATURE ELASTOMERIC POLYMER DISK AND PROCESS FOR USING MANDREL

BACKGROUND OF THE INVENTION

This invention relates in general to an improved mandrel for transporting hollow cylinders and, more specifically, to a mandrel and process for using the mandrel for coating hollow cylinders.

Although this invention is especially useful for the fabrication of electrostatographic imaging members, it is not limited to such application. Electrostatographic imaging members are will known in the art and include electrophotographic imaging members and electrographic imaging members.

Electrophotographic imaging members may be in the shape of a hollow drum or cylinder and are coated with at least one active electrophotographic imaging layer. The active electrophotographic imaging layer may comprise a single photoconductive layer or comprise a plurality of active electrophotographic layers such as a charge generating layer and a charge transport layer. These drum shaped electrophotographic imaging members embodiments are well known in the art.

Electrostatographic drums are conventionally coated by immersing hollow cylinders into a liquid coating solution, withdrawing the cylinders coated with the coating solution and drying the coating on the cylinders. Generally, the coating applied to the cylinder is confined to the exterior surface of the cylinder to conserve coating material, to avoid heat build-up, and to provide an internal contact surface for electrical contact for electrical grounding or biasing. To prevent any significant deposition of coating material onto the interior of the cylinder during immersion of the substrate into the coating bath, the cylinder axis is maintained in a vertical position or attitude and air within the hollow cylinder is trapped in at least the lower section of the interior of the cylinder by various known techniques. Trapping of the air in the cylinder while the cylinder axis is maintained in a vertical attitude minimizes wasteful deposition of coating material within the interior of the cylinder. One technique for trapping air within the cylinder is to insert the lower end of a mandrel into the upper open end of a cylinder, the mandrel having an expandable component positioned at or adjacent to its lower end which can be expanded to firmly contact and grip the interior of the cylinder to form a seal which traps air in the section of the cylinder below the seal during immersion of the cylinder in a coating liquid. One such technique is described in U.S. Pat. No. 4,680,246, the entire disclosure thereof being incorporated herein by reference. In another embodiment, the expandable mandrel component has a shape similar to that of a disk or thick washer. The outside diameter of this expandable disk shaped member, in its normal unstressed state, is slightly less than the interior diameter of the cylinder that is transported by the mandrel. The axis of this disk is coaxial with the main mandrel body. The expandable disk is expanded by applying compressive pressure on at least a segment of the upper and lower surfaces of the disk. The applied compression pressure causes the length of the circumference of the circular outermost edge of the disk to increase sufficiently whereby the outer periphery of the disk firmly contacts and grips the interior surface of the cylinder so that the mandrel can support and carry the cylinder from one location to another and also function as an air seal to trap air within the interior of the cylinder in the section below the cylinder when the cylinder is immersed in a liquid coating bath. The compressive pressure may be applied to the disk by applying a pulling or tension force on a tension shaft extending from a presser means through the center of the disk and through the mandrel body whereby the disk is squeezed by the presser means against the adjacent lower end of the mandrel body. The use of a mandrel that supports a hollow cylinder by gripping only the interior of the cylinder facilitates coating of the exterior surface of the cylinder without any mechanical object contacting either the exterior surface of the cylinder or the coating deposited on the exterior surface. The mandrel is supported at its upper end by any suitable conventional conveyor means. The conveyor means can comprise means to raise and lower the mandrel and/or the entire conveyor means may be raised and lowered by any suitable and conventional means such as an elevator means.

Although expandable disk shaped members made of natural or synthetic rubber or elastomers such as ethylene-propylene terpolymer perform well for a dip coating step, it has been found necessary that the freshly coated cylinder be supported on a metallic platen for transportation through a drying device or zone because the expandable disk or inflatable bladder tends to stick to the interior wall of a cylinder and inhibit or prevent mandrel removal after exposure to elevated temperatures during drying of the deposited coating. Also, the memory properties of the expandable disk or expandable bladder material degrade rapidly when repeatedly exposed to temporary compression or expansion forces and elevated drying temperatures. Degradation of the memory properties prevents the material from returning to its original shape and size after distortion. This, in turn, can cause difficulties in separating the disk or inflatable bladder from the interior wall of a cylinder.

Expandable bladders also require a compressed fluid source, complex air tubing and couplings, air seals and the like which greatly increase the likelihood of failure during a coating or drying operation. For example, an air leak can cause a coated cylinder to fall away from a mandrel during or after coating. If a drum falls into a coating bath or onto the floor of a drying oven, the entire coating line must be shut down to remove the fallen drum and to repair the leak. Moreover, the large contact area between an inflated bladder and the interior of a cylinder presents heat transfer problems that ultimately result in coatings that have undesirable non-uniform physical and electrical characteristics following drying.

INFORMATION DISCLOSURE STATEMENT

U.S. Pat. No. 4,680,246 to Aoki et al, issued Jul. 14, 1987—A method is disclosed for holding a hollow cylindrical body without a bottom without contacting the outside surface thereof and immersing the body in a liquid with which the outside surface of the cylindrical body is to be coated and preventing the liquid from contacting the inside wall of the cylindrical body. The method utilizes a device which includes an inflatable elastic membrane which tightly contacts the inside wall of the cylindrical body and holds the body when it is inflated by supply of compressed fluid. A process for producing an electrophotographic element is also disclosed including the steps of holding the hollow cylindrical body without a bottom, immersing the cylindrical body in a liquid containing a photosensitive material and separating the cylindrical body from the liquid to form a uniform photosensitive layer only on the outside surface thereof.

U.S. Pat. No. 3,945,486 to Cooper, issued Mar. 23, 1976—Apparatus is disclosed for releasably supporting and transporting rigid open-mouthed containers by engaging the interior surface of the container mouth with an inflatable elongated elastomeric diaphragm, means being provided for inflating and deflating the diaphragm. The apparatus is particularly useful in suspending and conveying heated glass bottles through various processing stages wherein various coatings are applied to the outer surfaces of the bottles. The elastomeric diaphragm may be molded from a silicone rubber elastomer.

U.S. Pat. No. 3,777,875 to Sobran, issued Dec. 11, 1973—A hanger or support apparatus is disclosed for suspending a container by engagement with the interior wall of the opening portion of the container. Means are provided for quickly engaging and disengaging the hanger. The hanger is particularly adapted for suspending heated glass bottles for conveyance through an electrostatic coating apparatus.

In copending application entitled "SELF ADJUSTING MANDREL WITH EXPANDABLE ELASTOMERIC DISK AND PROCESS FOR USING MANDREL", Ser. No. 07/995,489, filed Dec. 23, 1992, a mandrel is disclosed comprising a mandrel comprising an elongated arm having a first end and a second end, a reciprocatable shaft coaxially aligned with and extending through the arm, a first end of the shaft extending beyond the first end of the arm and a second end of the shaft extending beyond the second end of the arm, a presser means mounted at the first end of the shaft, an expandable disk shaped member coaxially aligned with and slidably mounted on the shaft between the presser means and the first end of the arm, a compression means mounted on the second end of the shaft, and a resilient helical spring coaxially aligned with and slidably mounted on the shaft between the presser means and the compression means, the compression means adopted to apply compression pressure to the disk shaped member and to the helical spring. This mandrel is used in a process for coating hollow cylinders. The entire disclosure of this application is incorporated herein by reference.

In copending application entitled "LOW ENERGY TRANSFER MANDREL AND PROCESS FOR USING MANDREL", Ser. No. 07/996,227, filed Dec. 23, 1992, a mandrel is disclosed comprising an elongated arm having a first end and a second end, a reciprocatable shaft coaxially aligned with and extending through the arm, a first end of the shaft extending beyond the first end of the arm and a second end of the shaft extending beyond the second end of the arm, a presser means mounted at the first end of the shaft, an expandable disk shaped member coaxially aligned with and slidably mounted on the shaft between the presser means and the first end of the arm, a compression means mounted on the second end of the shaft, and a resilient helical spring coaxially aligned with and slidably mounted on the shaft between the presser means and the compression means, the compression means adopted to apply compression pressure to the disk shaped member and to the helical spring. The entire disclosure of this application is incorporated herein by reference.

In copending application entitled "MANDREL WITH FLARED, DISH SHAPED DISK AND PROCESS FOR USING MANDREL", Ser. No. 07/996,431, filed Dec. 23, 1992, a mandrel is disclosed comprising a mandrel for transporting a hollow cylinder comprising an elongated arm, a dish shaped disk adjacent one end of the elongated arm, the dish shaped disk having a flexible lip flared inclined away from the elongated arm, the flared flexible lip having a circular outermost edge, and a reciprocable presser means adapted to partially flatten at least a portion of the flexible lip adjacent to and including the outermost edge of the lip toward the elongated arm to increase the length of the circumference of the circular outermost edge of the lip. This mandrel is used in a process for coating hollow cylinders. The entire disclosure of this application is incorporated herein by reference.

In copending application entitled "Dip Coating Process Material Handling System", Ser. No. 07/995,491, filed Dec. 23, 1992, a dip coating system for applying and drying coatings is disclosed that is capable of using the mandrel of this invention. The entire disclosure of this application is incorporated herein by reference.

SUMMARY OF THE INVENTION

It is, therefore, an object of the present invention to provide an improved mandrel and process of using the mandrel which overcomes the above-noted deficiencies.

It is another object of the present invention to provide an improved mandrel which resists deterioration when subjected to high temperatures.

It is yet another object of the present invention to provide an improved mandrel which withstands cyclic temperature excursions.

It is another object of the present invention to provide an improved mandrel which is resistant to chemical fumes.

It is yet another object of the present invention to provide an improved mandrel having and expandable component that retains plastic memory when repeatedly subjected to simultaneous heating and compressing.

The foregoing objects and others are accomplished in accordance with this invention by providing a mandrel for transporting a hollow cylinder comprising an elongated arm having an imaginary axis, an expandable disk shaped member having at least one hole and a circular outermost edge, the disk shaped member being mounted on and coaxially aligned with one end of the arm and comprising an elastomeric polymer material having a durometer of between about 25 and about 35 and a maximum continuous use temperature rating of at least about 230° C., and means mounted on the mandrel to apply compressive pressure to the disk shaped member to increase the length of the circumference of the circular outermost edge. This mandrel is used in a process for coating hollow cylinders.

BRIEF DESCRIPTION OF THE DRAWINGS

A more complete understanding of the process of the present invention can be obtained by reference to the accompanying drawings wherein.

The figures are merely schematic illustrations of the prior art and the present invention. They are not intended to indicate the relative size and dimensions of mandrels or components thereof.

DETAILED DESCRIPTION OF THE DRAWINGS

Figure 1:
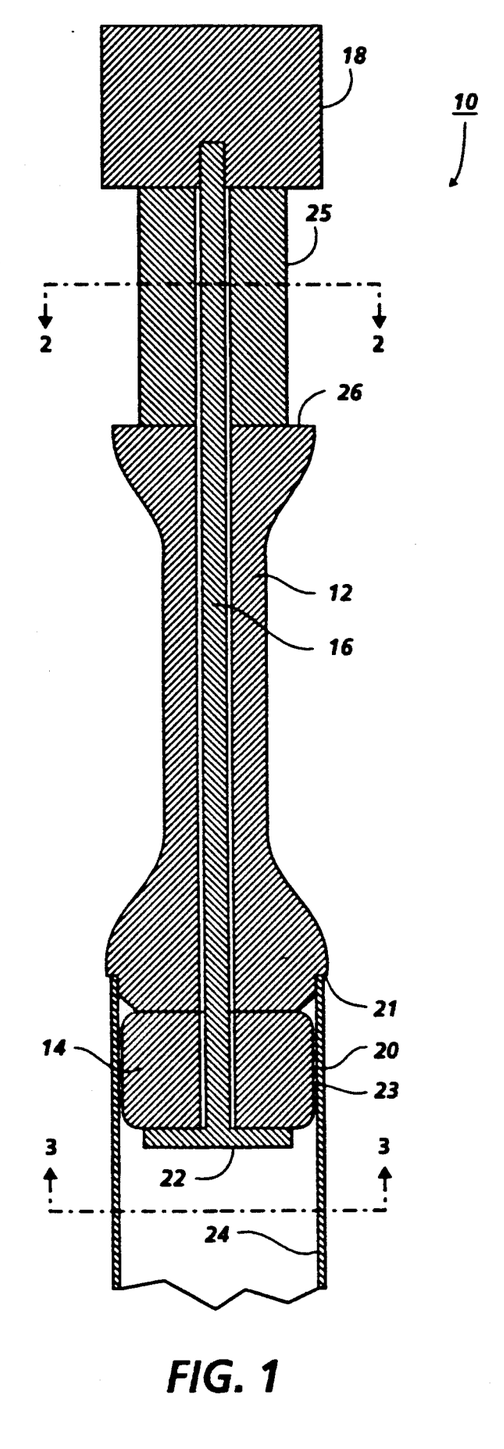
FIG. 1 is a schematic illustration of a sectional view in elevation of a mandrel of this invention.

Referring to FIG. 1, a mandrel 10 is shown comprising an elongated arm 12, an expandable disk shaped member 14, a tension shaft 16, tension applying means 18 attached to the upper end of tension shaft 16 and mounted and supported by the upper end of elongated arm 12, and hollow cylinder 20. The upper edge of hollow cylinder 20 is seated against alignment shoulder 21 to ensure that hollow cylinder 20 is coaxially with the axis of mandrel 10. Secured to the lower end of tension shaft 16 is a presser means 22. Tension applying means 18 may comprise any suitable means capable of pulling tension shaft 16, tension upwardly. Typical tension applying means include, for example helical springs, solenoids, two way acting air cylinders, screws, levers, notched ramps, cam devices and the like. When tension applying means 18 is activated by any suitable technique such as supplying electricity to or terminating the supplying of electricity to a solenoid, it pulls tension shaft 16 upwardly. Upward movement of tension shaft 16 causes a corresponding upward movement of presser means 22 which compresses expandable disk shaped member 14 against the bottom end of elongated arm 12. Application of compression pressure on at least a sufficient area of the top and bottom surfaces of expandable disk shaped member 14 causes the circular outermost edge 23 to increase in circumference whereby it contacts, frictionally grips and forms an air tight seal with the interior surface 24 of hollow cylinder 20. Expandable disk shaped member 14 is illustrated in FIG. 1 in a relaxed condition prior to application of compressive pressure. Thus, the circular outermost edge 22 has a flat profile and is shown out of contact with the interior surface 24 of hollow cylinder 20. Constricted section 25 of elongated arm 12 may be inserted into a yoke or hole of any suitable conveyor means (not shown) prior to mounting of tension applying means 18 to secure mandrel 10 to the conveyor means.

Figure 2:
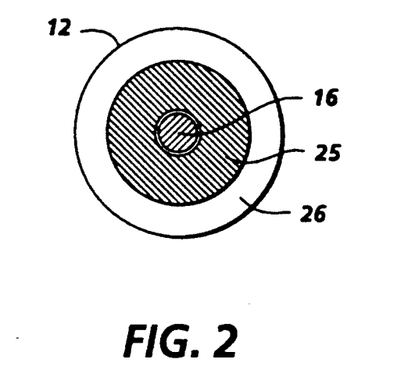
FIG. 2 is a schematic illustration of a cross sectional view of the upper segment of the mandrel shown in FIG. 1 taken along line 2—2.

In FIG. 2 the upper segment of the mandrel shown in FIG. 1 is viewed in direction along lines 2—2 and illustrate upper shoulder 26 of elongated arm 12 and tension shaft 16. Upper shoulder 26 serves as a stop for the conveyor means described above.

Figure 3:
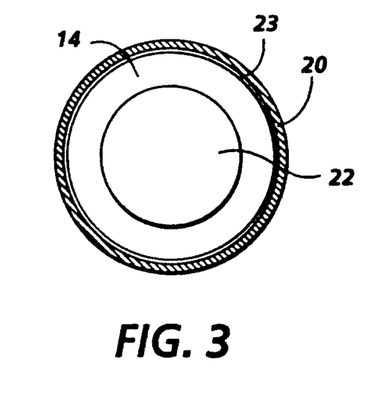
FIG. 3 is a schematic illustration of a view of the bottom of the mandrel shown in FIG. 1.

Depicted in FIG. 3 is the bottom of mandrel 10 with presser means 22 and circular outermost edge 23 of expandable disk shaped member 14 extending beyond the outer periphery of presser means 22.

Figure 4:
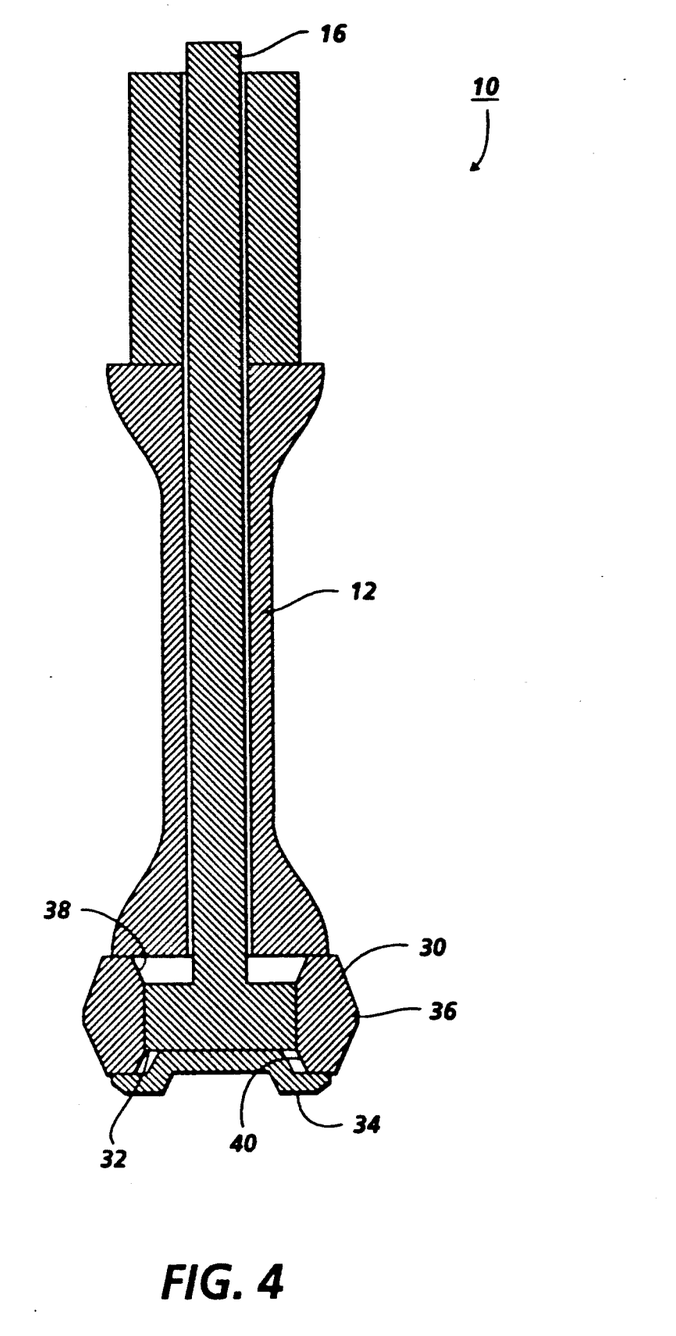
FIG. 4 is a schematic illustration of a sectional view of another embodiment of a mandrel of this invention.

Referring to FIG. 4, a mandrel 10 is shown comprising an elongated arm 12, an expandable disk shaped member 30, a tension shaft 16 having at its lower end an enlarged cylindrically shaped support means 32 and a presser means 34 secured to support means 32. If desired, presser means 34 may be removably secured to support means 32 by any suitable technique such as threaded bolt (not shown) to facilitate replacement of expandable disk shaped member 30. Expandable disk shaped member 30 has a blunt chisel shaped cross section, the point or apex 36 of which enables only line contact between expandable disk shaped member 30 and the interior wall of the cylinder (not shown) when compression pressure is applied to at least a portion of the top and bottom surfaces of expandable disk shaped member 30. Line contact reduces heat transfer. The upper surface 38 and lower surface 40 of the hole extending through expandable disk shaped member 30 are tapered outwardly in the direction of the adjacent hole openings to prevent disk material from being pinched by cylindrically shaped support means 32 when compression pressure is applied to the top and bottom surfaces of expandable disk shaped member 30. Expandable disk shaped member 30 is illustrated in FIG. 4 in a relaxed condition prior to application of compressive pressure.

Figure 5:
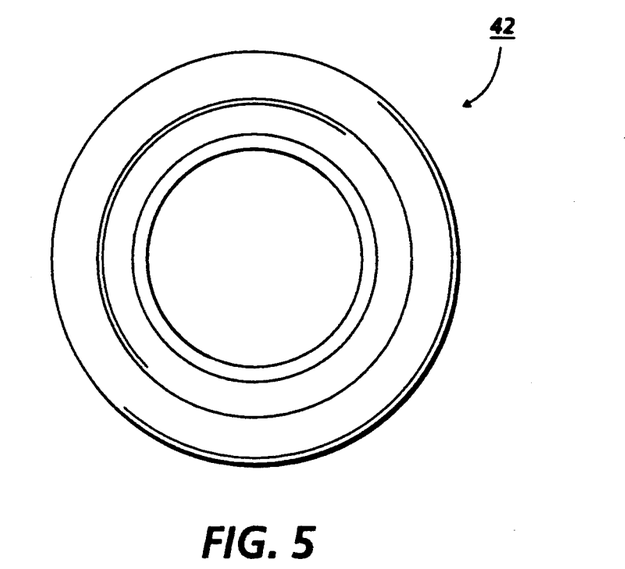
FIG. 5 is a schematic illustration of a plan view of an expandable disk shaped member of this invention.
Figure 6:
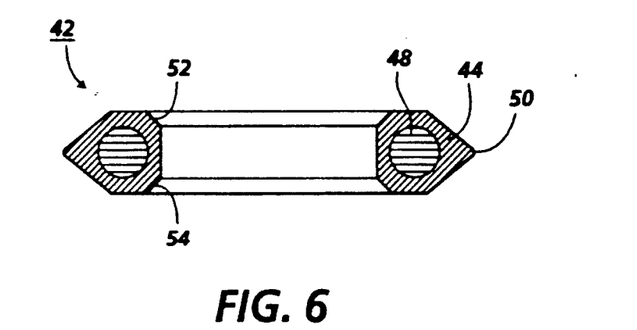
FIG. 6 is a schematic illustration of a sectional view in elevation of the expandable disk shaped member shown in FIG. 5.
Figure 7:
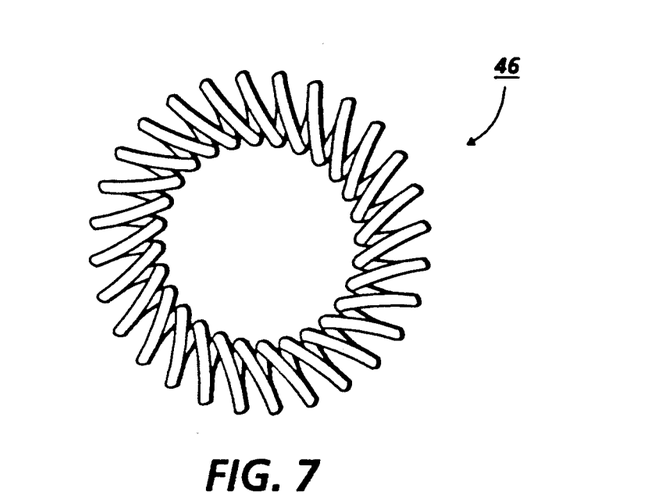
FIG. 7 is a schematic illustration of a plan view of a component embedded in the expandable disk shaped member shown in FIG. 5.

FIGS. 5, 6 and 7 illustrate another embodiment of an expandable disk shaped member 42 of this invention. Expandable disk shaped member 42 comprises an outer matrix 44 of high durometer elastomeric polymer material, a helical spring 46 and an inner ring shaped matrix 48 of low durometer elastomeric polymer material. This composite arrangement retains the high temperature resistance and memory stability of the high durometer elastomeric polymer material in outer matrix 44 and in spring 46 while taking advantage of the compressibility of low durometer elastomeric polymer material in inner ring shaped matrix 48. Expandable disk shaped member 42 has a blunt chisel shaped cross section, the point or apex 50 of which enables only line contact with the interior wall of the cylinder (not shown) to reduce heat transfer. The upper surface 52 and lower surface 54 of the hole extending through expandable disk shaped member 42 are tapered outwardly in the direction of the adjacent hole opening to prevent extrusion of any disk material into any adjacent spaces.

Figure 8:
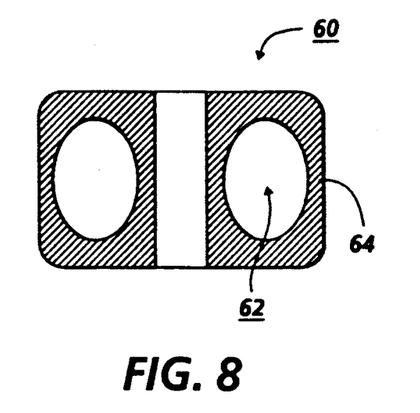
FIG. 8 is a schematic illustration of a sectional view in elevation of another embodiment of an expandable disk shaped member of this invention.

In FIG. 8, another embodiment of an expandable disk shaped member 60 of this invention is shown with a permanently sealed hollow annular chamber 62. The circular outermost edge 64 is substantially flat and parallel to the axis of the mandrel.

Figure 9:
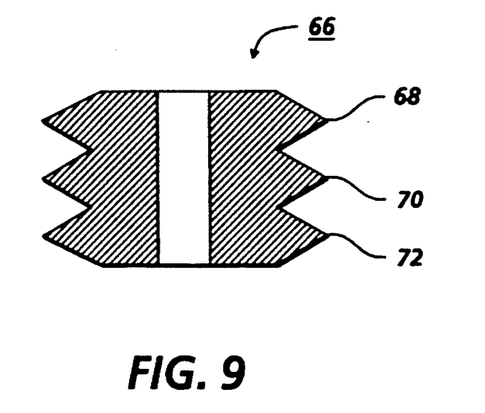
FIG. 9 is a schematic illustration of a sectional view in elevation of still another embodiment of an expandable disk shaped member of this invention.

Referring to FIG. 9, still another embodiment of an expandable disk shaped member 66 of this invention is illustrated with a bellows shaped profile with multiple chisel shaped edges 68, 70 and 72, one at the peak of each bellows ridge.

Figure 10:
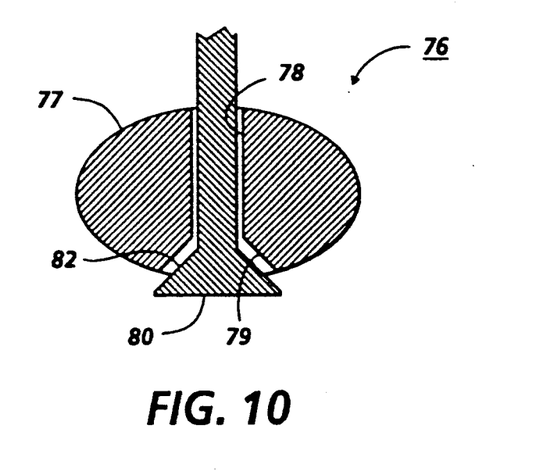
FIG. 10 is a schematic illustration of a sectional view in elevation of still another embodiment of an expandable disk shaped member and presser means of this invention.

FIG. 10 shows another embodiment of an expandable disk shaped member 76 of this invention having an egg or oval shaped cross section. The circular outermost edge 77 is rounded. The bottom of hole 78 through disk shaped member 76 has a countersunk surface 79 to accommodate a presser means 80 having a tapered surface 82 adapted to mate with countersunk surface 79. The tapered surface 82 imparts to expandable disk shaped member 76, a compressive force having a vertical component and components angled away from the axis of disk shaped member 76 toward circular outermost edge 77. If desired, the bottom of the mandrel arm (not shown) can also have a tapered shape similar to tapered surface 82 and the top of hole 78 through disk shaped member 76 can have a countersunk surface (not shown) to accommodate the tapered bottom of the mandrel arm. Alternatively, only the top and not the bottom of disk shaped member 76 can have a countersunk opening adjacent a tapered mandrel end (not shown).

Figure 11:
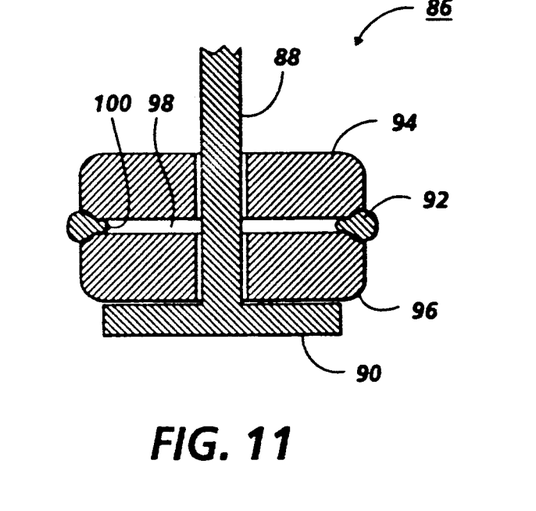
FIG. 11 is a schematic illustration of a sectional view in elevation of an "O" ring arrangement.

Depicted in FIG. 11 is an unsuitable mandrel 86 having a tension shaft 88, a presser means 90, "O" ring 92 and "O" ring retaining disks 94 and 96. A space 98 is necessary in order to permit relative movement of "O" ring retaining disks 94 and 96 toward each other to apply compression pressure on the top and bottom of "O" ring 92 when presser means 90 is moved toward the bottom of a mandrel (not shown). Because of the compressive force necessary to sufficiently expand "O" ring 92, a bead 100 of the material from "O" ring 92 is extruded into space 98 and pinched between ring retaining members 94 and 96. Cyclic deformation of "O" rings at elevated drying temperatures causes undesirable permanent reshaping of the "O" rings because the conditions encountered during cycling approach the original "O" ring molding process conditions.

The expression "disk shaped member" is intended to include any suitable shape generally resembling a disk or thick washer having at least one circular outermost edge. The disk shaped member also contains at least one hole to accommodate reciprocal movement of at least one tension shaft. The hole or holes in the disk shaped member may be of any suitable shape. Typically, the hole is circular to avoid concentration of stress during compression. Generally, the length of the diameter or diameters of the disk hole or holes, respectively, is less than about 70 percent of the length of the outside diameter of the disk (i.e. diameter of the circular outermost edge) to minimize memory fatigue during cycling and to ensure that sufficient elastomeric material is present to for adequate expansion when the disk is compressed. A single central hole is preferred for reasons of simplicity and maximization of disk durability. A plurality of holes increases device complexity and can reduce the strength of the mandrel arm. When the length of the diameter of the disk hole is at least about 80 percent of the length of the outside diameter of the disk, the disk is no longer a disk and more like an "O" ring. Because of the pressures applied, a bead of "O" ring material tends to extrude into the crack between the pressure applying surfaces and degrade rapidly when exposed to compression cycling as shown in FIG. 11. When O rings are deformed more than about 10 percent of their original dimension at room temperature, "O" rings tend to exhibit degradation during extended cycling. Deformation of "O" rings at high temperatures causes reshaping of the "O" ring because the conditions encountered during cycling approach the original "O" ring molding process conditions and the "O" ring material tends to flow at temperatures of about 66° C. (150° F.). Moreover, memory is lost and the "O" ring does not return to its original shape when compression forces are released.

The extreme circular outermost edge of the disk may be of any suitable shape including rounded, flat, angular, or the like. A typical shape for the expandable disk is similar to that of a donut as illustrated in FIGS. 1 and 10. Also, other than the hole or holes to accommodate at least one tension shaft, the disk may be completely solid or contain one or more hollow chambers. If the disk contains at least one hollow chamber, e.g. see FIG. 8, the chambers should be totally sealed. These sealed chambers are permanently filled with a fluid such as air or water or a low durometer elastomer. Further, the circular outermost edge of the disk may have a chisel shaped cross section to minimize contact area between the disk and the interior wall of the cylinder thereby reducing heat transfer. See, for example, FIGS. 4 and 6. Alternatively, as shown in FIG. 9, the edge of the expandable disk shaped member may be formed into a bellows configuration where a cross-sectional view of the outer periphery of the disk resembles the sides of a bellows. Because of the multiple contact surfaces between the outermost apex or chisel edge of each bellows ridge, heat transfer is minimized and the air seal between the upper and lower interior regions of the cylinder is enhanced. The outermost periphery of each segment of the bellows that ultimately contacts the interior surface of the hollow cylinder when the bellow shaped disk is compressed are substantially circular to ensure uniform contact between the disks and the interior surface of the hollow cylinder to achieve an adequate seal for trapping air or other ambient fluid within the cylinder beneath the disk when the cylinder is immersed in a coating liquid bath.

The minimum size of the disk can vary considerably depending upon the means utilized to apply compression force to squeeze the disk whereby the outside diameter of the disk expands sufficiently to contact and frictionally grip the interior surface of the cylinder. The thickness of the expandable disk shaped member should be at least about 3 millimeters (⅛ inch). A thickness of at least about 6 millimeters (0.25) inch is preferred. For most disk shapes, optimum results are achieved with a thickness of at least about 7.5 millimeters (0.3) inch. There does not appear to be any maximum thickness except for the cost of excess material. When a disk has a single sharp chisel shaped outer periphery, very little deformation pressure is required to increase the outside diameter of the disk. Since less pressure is required, the disk can be relatively thin, for example, as thin as about 7.5 millimeters (0.3) inch. For use with a hollow cylinder having an inside diameter of about 4 cm and a weight of about 100 grams, typical dimensions for a suitable, generally flat disk having a chisel shaped outer periphery and a single central hole are a thickness between the innermost surface (measured radially from edge of hole) and the apex (outermost edge) of the chisel shaped profile of about 8.5 millimeters (0.33 inch), a thickness from top to bottom of about 11.5 millimeters (0.45) inch, an outside diameter (diametrically measured from apex to apex) of about 36.5 millimeters (1.44 inches) and a hole diameter of about 20.5 millimeters (0.8 inch).

For satisfactory results the elastomeric polymer material employed in the expandable disk shaped member has a durometer between about 20 and about 40. Generally, when the durometer is less than about 25, the elastomeric tends to begin adhering to the interior of the cylinders thereby rendering difficult or preventing release of the cylinder from the mandrel. Durometers greater than about 35 begin to prevent adequate deformation thereby eventually preventing the disk to increase in diameter sufficiently to support a cylinder. Thus, optimum results are achieved with a durometer between about 25 and about 35.

The elastomeric material utilized in the expandable disk shaped member should also have an ASTM maximum continuous use temperature rating of at least about 230° C. to retain its memory properties and to avoid chemical and physical degradation during repeated compression and high temperature cycling while coating a plurality of hollow cylinders. The expression "maximum continuous use temperature rating" as employed herein is defined as the maximum temperature at which the elastomer can maintain substantially all of its original shape prior to heating and remain chemically stable without decomposing.

Any suitable high temperature resistant elastomeric polymer having the aforesaid durometer and maximum continuous use temperature characteristics may be utilized. The disk elastomeric polymer should also should be inert and resistant to the solvents utilized in the coating mixtures. Typical elastomers having a durometer of between about 25 and about 35 and a maximum continuous use temperature rating of at least about 230° C. include, for example, elastomeric fluorocarbon rubbers, silicone rubbers, fluorosilicone rubbers, ethylene propylene rubber, and the like. Optimum results are achieved with fluoroelastomeric copolymers of vinylidene fluoride and hexafluoropropylene. Fluoroelastomeric copolymers of this type are available under the trademark Viton, available from E. I. duPont de Nemours & Company. These copolymers are stable and flexible at temperatures as high as about 232° C. (450° F.) for short periods of time. Another example of a preferred high temperature resistant polymer is a terpolymer elastomer of ethylene-propylenediene monomer, an elastomer based on stereospecific linear terpolymers of ethylene, propylene and small amounts of a nonconjugated diene such as a cyclic or aliphatic diene (hexadiene, dicyclopentadiene, or ethylidene norbornene), the unsaturated part of the terpolymer molecule is pendent from the main chain which is completely saturated. This terpolymer is resistant to temperatures as high as 148° C.

Although metals are deformable under sufficient applied pressure, they are thermally conductive and form a heat sink at the point of contact with the interior surface of the cylinder thereby cooling the cylinder at the contact point which in turn causes deformation of the coating during drying at elevated temperatures. Also, the force required to compress metal would collapse most ordinary mandrel arms during the disk compression step. Thus, the expandable disk shaped member should comprise an elastomeric polymer material having a durometer of between about 25 and about 35.

Typically, the average radial distance between the outermost surface of the expandable disk shaped member and the interior surface of the cylinder prior to disk expansion is about 250 micrometers (0.01 inch). This spacing allows the disk to be readily introduced into the interior of the cylinder prior to expansion of the disk and allows the cylinder to fall away by gravity from the disk after the outer circumference of the disk is contracted. Preferably, the maximum average radial distance between the outermost surface of the disk and the inner surface of the cylinder prior to disk expansion is about 500 micrometers (0.020 inch). Distances greater than about 500 micrometers tend to increase the length of the disk during cycling. More specifically, extensive deformation of a disk followed by release of the deforming pressure to allow the disk to return to its original shape develops unwanted memory effect which gradually prevents complete return of the expanded disk to its original shape when extensively cycled. This decreases the life of the disk dramatically. The average radial distance between the outermost surface of the disk and the inner surface of the cylinder prior to disk expansion should at least be sufficient to permit the disk to be easily slid into the interior of the hollow cylinder.

Any suitable means may be utilized to compress the expandable disk shaped member. Generally, expansion of the disk shaped member is achieved by compressing the disk between the mandrel and the presser means. The presser means is activated or inactivated by means of a reciprocatable tension shaft. One end of the presser shaft is secured to the presser means and the other end of the shaft extends through the elongated arm of the mandrel to a means for moving the shaft in an axial direction toward the presser means or away from the presser means. Movement of the shaft toward the presser means removes the compression force applied to the expandable disk shaped member whereas movement of the shaft in a direction away from the compressor means causes the presser means to compress the disk against the lower end of the mandrel arm. Any suitable means may be utilized to apply tension to the tension shaft. A tension supplying means may simply be, for example, a nut threaded onto the tension shaft. Activation of the tension supplying means by screwing the nut onto the tension shaft in the direction of the mandrel body places the tension shaft under tension which in turn pulls the presser means toward the disk and compresses the disk against one end of the mandrel body. Other typical tension supplying means include solenoids, two way acting air pistons, hydraulic pistons, coil springs, air cylinders, latching cams, screws, levers, notched ramps, cam devices, and the like. Means for reciprocating the shaft in one direction or another include any suitable device such as a cam, solenoid, two-way acting air piston, motor driven crank shaft in which the reciprocal shaft functions as a connecting rod, screws, levers, notched ramps, cam devices, and the like. Generally, compression pressure is applied to at least a portion of the top and bottom of the expandable disk shaped member. The presser means may have any suitable shape that will apply sufficient pressure to the bottom of the disk to increase the length of the circumference of the circular outermost edge and to effectively seal the hole in the disk. Preferably, the surface of the presser means facing the disk has a contour that generally conforms to the contour of the bottom surface of the disk.

When compressed sufficiently to force the circular outermost edge of the disk into frictional contact with the interior surface of the hollow cylinder, the disk must function as both an air seal and a substrate holding device. Generally, the amount of applied compression force affects the cycling life of the disk. Preferably, the compression force utilized to adequately expand the outer periphery of the disk should be less than about 65 percent of the maximum memory force rating of the elastomeric material being utilized. Typical maximum memory force ratings for typical elastomeric material having a durometer of between about 25 and about 35 and having a maximum continuous use temperature of at least about 230° C. include, for example, 40 psi for silicone; 60–120 psi for fluorosilocones; 70–150 psi for fluorocarbons; and the like.

Generally, compression pressure applied to a disk is adjusted at room temperature to a predetermined cylinder pull off force. For example, a pull off force of about 15 pounds for pulling a hollow cylinder off of a mandrel having an expanded disk at room temperature is satisfactory for transporting a hollow cylinder weighing about 80 to about 120 grams. Obviously the pull off force varies with the weight of the hollow cylinders to be transported. Typically, a pull off force at room temperature can range from about 1 pound to about 30 pounds depending on the actual weight selected for most conventional aluminum cylinders. A pull off force greater than about 30 pounds is usually undesirable because the gripping force causes elastomer memory degradation and increases the heat sink characteristics of the expandable donut.

The mandrel may be supported at its upper end by any suitable conveyor means. The conveyor means can comprise means to grip the upper end of the mandrel, such as a collar or chuck. The tension applying means may be manually activated or inactivated by an operator or automatically by any suitable and conventional electric or fluid supply means controlled by switches or valves. The mandrels may be raised and lowered manually or by any suitable and conventional reciprocatable means such as a ball and screw, two way acting air piston, hydraulically actuated pistons, chain and gear systems, screw and block systems, cams, ramps, cranes, and the like. The mandrel and/or the entire conveyor means may be raised and lowered by any suitable and conventional means such as an elevator means.

Generally, the cylinders are immersed into a liquid coating mixture until only a small uncoated band around the uppermost end of the cylinder remains above the level of the liquid coating material bath. This prevents deposition of coating on the small band. This uncoated band may be utilized for electrically grounding the cylinder during electrophotographic imaging, if the cylinder is electrically conductive. The uncoated band can also be used to support spacers which ride on the uncoated area to space other subsystems out of contact with the coated drum. Also, total immersion of the cylinder in the coating mixture is undesirable because the coating mixture can overflow the top edge of the cylindrical cylinder and form unwanted deposits on the mandrel, disk and interior of the cylinder. Although dip coating may be effected by moving the drum vertically downward into a coating liquid bath, dip coating may also be accomplished by moving the coating liquid bath, upwardly or by a combination of these movements. For purposes of convenience, all these movements are considered as encompassed by the expression "immersing". Means for lowering and raising the mandrel are well known among those skilled in the art and the detailed description thereof is omitted herein.

There are various cylindrical electrostatographic imaging member embodiments. Typically, a hollow cylindrical substrate is provided having an electrically conductive surface. For electrophotographic imaging members, at least one photoconductive layer is then applied to the electrically conductive surface. An optional charge blocking layer may be applied to the electrically conductive layer prior to the application of the photoconductive layer. If desired, an adhesive layer may be utilized between the charge blocking layer or conductive layer and the photoconductive layer. For multilayered photoreceptors, an electrophotographic imaging layer comprising a charge generation layer and a charge transport layer is usually applied onto the underling surface. For ionographic imaging members, an electrically insulating dielectric layer is applied to the electrically conductive surface.

The cylindrical substrate, i.e. hollow cylinder is usually opaque but can be substantially transparent. The hollow cylinder may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are molded or extruded into hollow cylinders. The electrically insulating or conductive substrate is relatively rigid.

The thickness of the cylindrical substrate depends on numerous factors, including rigidity and economical considerations, and thus may be of substantial thickness, for example, about 4 millimeters, or of a minimum thickness of about 50 micrometers, provided there are no adverse effects on the final electrostatographic device. The surface of the substrate layer is preferably cleaned prior to coating to promote greater adhesion of the deposited coating. Cleaning may be effected, for example, by exposing the surface of the substrate layer to plasma discharge, ion bombardment and the like.

If the bulk of the cylindrical substrate is electrically insulating it is provided with an electrically conductive surface layer. The conductive layer may vary in thickness over substantially wide ranges depending on the optical transparency desired for the electrostatographic member. The conductive layer may be an electrically conductive metal layer formed, for example, on the substrate by any suitable coating technique, such as a vacuum depositing technique. A typical electrical conductivity for conductive layers for electrophotographic imaging members in slow speed copiers is about $10^2$ to $10^3$ ohms/square. Generally, the entire hollow cylindrical substrate comprises a single metal such as aluminum, nickel, common alloys of aluminum, rigid plastics, and the like.

An optional charge blocking and/or adhesive layers may be applied to the electrically conductive surface of a hollow cylinder for photoreceptors. Charge blocking and adhesive charge layers are well known in the art and usually comprise a film forming component and a solvent. Any suitable charge blocking and/or adhesive layer well known in the art may be utilized. Typical charge blocking and/or adhesive layer materials include, for example, nylon, polyesters, polyurethanes, and the like. For convenience in obtaining thin layers, the blocking and/or adhesive layers are preferably applied by immersion of the cylinder in a dilute solution bath, with the solvent being removed after deposition of the coating by conventional drying techniques such as forced air heating, infrared radiation heating, and the like. The blocking layer should be continuous and have a uniform thickness.

Any suitable photogenerating layer may be applied to the blocking and/or adhesive blocking layer. The photogenerating layer is then overcoated with a contiguous hole transport layer as described hereinafter. Examples of typical photogenerating layers include inorganic or organic photoconductive particles dispersed in a solvent solution of a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved. Drying of the immersion deposited coating to remove solvent may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of a polymeric film forming resin in which the aromatic amine is soluble.

The charge transport layer forming mixture may comprise any suitable charge transporting molecule disolved or molecularly dispersed in a solvent solution of a film forming binder. Any suitable resin binder dissolved in a solvent may be employed in the process of this invention. Typical inactive resin binders soluble in methylene chloride include polycarbonate resin, polyvinylcarbazole, polyester, polyarylate, polyacrylate, polyether, polysulfone, and the like. Molecular weights can vary, for example, from about 20,000 to about 150,000.

Generally, the thickness of the hole transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. No. 4,265,990, U.S. Pat. No. 4,233,384, U.S. Pat. No. 4,306,008, U.S. Pat. No. 4,299,897 and U.S. Pat. No. 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Drying of the deposited coating to remove solvent may be effected by any suitable conventional technique such as oven drying, infra red radiation drying, vacuum drying, ambient air flow drying, compressed air drying, and the like.

Optionally, an overcoat layer may also be utilized to improve resistance to abrasion. Overcoatings are continuous and generally have a thickness of less than about 10 micrometers.

For electrographic imaging members, a dielectric layer overlying the conductive layer may be substituted for the photoconductive layers. Any suitable, conventional, flexible, electrically insulating dielectric film forming polymer may be used in the dielectric layer of the electrographic imaging member. The polymer is dissolved in a solvent when applied by immersion coating. Drying of the deposited coating to remove solvent may be effected by any suitable conventional technique such as oven drying, infra red radiation drying, vacuum drying, ambient air flow drying, compressed air drying, and the like.

The mandrel of this invention withstands the temperature excursions, chemicals, and chemical fumes associated with the immersion coating and processing of hollow cylinders.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

An aluminum drum having an inside diameter of about 3.9 cm, a wall thickness of 0.005 cm and a length of about 30 cm was mounted onto a mandrel. The mandrel comprised an elongated, generally cylindrically shaped aluminum arm having a length of about 13 cm and an average diameter less than about 0.5 cm. The arm contained a hole extending axially through the arm from one end of the arm to the other. An expandable circular disk shaped member having a flat top and flat bottom, a circular edge with a donut shaped profile and a diameter of 3.6 cm was provided with a hole extending axially through the center of the disk. This hole had a diameter of 2.1 cm. This disk was made from opaque white silicone polymer. The polymer had a durometer of about 25 and a maximum continuous use temperature rating of about 155° C. The disk was mounted onto one end of the arm by means of a tension shaft. The tension shaft had a diameter of 10 millimeters and a length of 20 cm and had a flat, disk shaped presser means welded to one of the shaft. The free end of the shaft was threaded through the hole in the expandable circular disk and through the hole extending through the elongated aluminum arm. The free end of the shaft extended about 5 cm beyond the end of the elongated aluminum arm. The free end of the shaft was threaded and was fitted with a washer and nut. The nut was tightened at room temperature until a pull off pressure of about 35 pounds was required to slide the drum off of the mandrel. The drum was then carried by the mandrel was vertically (attitude of drum axis) immersed into a coating bath of a solution of a 10 percent by weight base layer polymer dissolved in n-butyl alcohol solvent at a temperature of 18° C. After vertically removing the coated drum from the coating bath, the drum, still carried by the mandrel, was heated in a forced air oven at a temperature of about 155° C. for about 30 minutes.

After drying and cooling to ambient temperature, the dried coated drum was tested for coating uniformity and electrostatic properties. It was found that the donut shaped disk had severely deformed under temperature and pressure. It would not readily return to its original shape nor would it release from the aluminum drum. The face temperature measurements of the drum during the oven heating cycle indicated that the silicone behaved as a considerable heat sink, thereby lowering the drum face temperature and lengthening the required oven heating cycle. This also quite unavoidably caused the formation of a non-uniform coating. As such, the coated drum proved to be quite unuseable since the drum had to be forceably removed. No such assistance can be readily provided or tolerated in a continuous production mode. Each of these several failure modes are unacceptable.

EXAMPLE II

The procedures described in Example I were repeated, except that the expandable circular disk shaped member was replaced with a disk shaped member having a flat top and flat bottom, a circular edge with a wedge shaped profile and a diameter of 36 mm was provided with a hole extending axially through the center of the disk. This hole had a diameter of 1.1 cm. This disk was made from white opaque silicone polymer. The polymer had a durometer of about 25 and a maximum continuous use temperature rating of about 155° C. After coating, drying and cooling, the dried coated drum was tested for coating uniformity and electrostatic properties. It was found that this disc shape would be acceptable for performing at room temperature. In fact it would make a very practical handling and transport device for the tube, both prior to and after the coating process. However, the disk permanently deformed at the elevated temperature and pressure. It also tended to adhere to the drum after coating due to the effects of the drying temperature, pressure and solvent exposure. Due to these results the design was unacceptable. Additionally, it was found that the disk behaved as a significant heat sink, which affected the coating uniformity.

EXAMPLE III

The procedures described in Example I were repeated, except that the expandable circular disk shaped member was replaced with a disk shaped member having a flat top and flat bottom, a circular edge with a wedge shaped profile and a diameter of 36 mm. was provided with a hole extending axially through the center of the disk. This hole had a diameter of 21 mm. This disk was made from medium blue silicone polymer and a maximum continuous use temperature rating of about 230° C. See FIG. 4. After coating, drying and cooling, the dried coated drum was tested for coating uniformity and electrostatic properties. It was found that this disk shape was also totally acceptable in all regards. The retentive strength or "pull-off force" remained constant at all test modes and temperatures. The shape did not distort at 'cool-down', nor did it display any memory effects. It had no tendency to stick to the inside of the contacting surface of the drums. There was no degredation to the polymer due to solvent exposure. The disk showed, as evidenced by drum substrate surface temperature data logging, no appreciable heat-sink properties. Accordingly, this polymer was replicated in the designated profiles as illustrated. In each case the same or similar results were obtained.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A mandrel for transporting a hollow cylinder comprising an elongated arm having an imaginary axis, an expandable disk shaped member having at least one hole and a circular outermost edge, said disk shaped member being mounted on and coaxially aligned with one end of said arm and comprising an elastomeric polymer material having a durometer of between about 25 and about 35 and a maximum continuous use temperature rating of at least about 230° C., and means mounted on said mandrel to apply compressive pressure to said disk shaped member to increase the length of the circumference of said circular outermost edge.

2. A mandrel according to claim 1 wherein said hole is a single central hole.

3. A mandrel according to claim 2 wherein the length of the diameter of said hole is less than about 70 percent of the length of the diameter of said circular outermost edge.

4. A mandrel according to claim 1 wherein said circular outermost edge comprises a plurality of parallel edges, each of said edges having a chisel shaped cross section.

5. A mandrel according to claim 1 wherein said circular outermost edge has a chisel shaped cross section.

6. A mandrel according to claim 1 wherein said disk shaped member has a thickness of at least about 3 millimeters.

7. A mandrel according to claim 1 wherein said disk shaped member comprises a sealed hollow chamber.

8. A mandrel according to claim 7 wherein said sealed hollow chamber is filled with an elastomer having a lower durometer than said elastomeric polymer material having a durometer of between about 25 and about 35.

9. A mandrel for transporting a hollow cylindrical electrostatographic imaging member comprising an elongated arm having an imaginary axis, an expandable disk shaped member having at least one hole and at least one circular outermost edge having a chisel shaped cross section, said disk shaped member being mounted on and coaxially aligned with one end of said arm and comprising an elastomeric polymer material having a durometer of between about 25 and about 35 and a maximum continuous use temperature rating of at least about 230° C., and means mounted on said mandrel to apply compressive pressure to said disk shaped member to increase the length of the circumference of said circular outermost edge until only said circular outermost edge contacts and grips said hollow cylinder.

10. A mandrel according to claim 9 wherein said expandable disk shaped member comprises a plurality of said circular outermost edges, each of said edges having a chisel shaped cross section.

11. A mandrel according to claim 10 wherein said expandable disk shaped member comprises three of said circular outermost edges, each of said edges having a chisel shaped cross section.

12. A mandrel according to claim 9 wherein said disk shaped member comprises a sealed hollow chamber.

13. A mandrel according to claim 12 wherein said sealed hollow chamber is filled with an elastomer having a lower durometer than said elastomeric polymer material having a durometer of between about 25 and about 35.

14. A mandrel according to claim 9 wherein said expandable disk shaped member comprises a helical spring embedded in said elastomeric polymer material.

* * * * *